United States Patent
Schiek

(10) Patent No.: US 8,298,055 B2
(45) Date of Patent: Oct. 30, 2012

(54) PROCESS AND SYSTEM FOR CONTROLLING THE PRESSURE IN AN AIRCRAFT CABIN

(75) Inventor: Thorsten Schiek, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 886 days.

(21) Appl. No.: 12/160,531

(22) PCT Filed: Jan. 9, 2007

(86) PCT No.: PCT/EP2007/000121
§ 371 (c)(1),
(2), (4) Date: Aug. 28, 2008

(87) PCT Pub. No.: WO2007/080096
PCT Pub. Date: Jul. 19, 2007

(65) Prior Publication Data
US 2009/0305622 A1 Dec. 10, 2009

(30) Foreign Application Priority Data
Jan. 12, 2006 (DE) .......................... 10 2006 001 685

(51) Int. Cl.
B64D 13/00 (2006.01)
B64D 13/02 (2006.01)
B64D 13/04 (2006.01)
B64D 13/06 (2006.01)
B64D 13/08 (2006.01)
B64C 1/14 (2006.01)

(52) U.S. Cl. ........ 454/74; 454/76; 244/129.5; 244/118.5

(58) Field of Classification Search ................... 454/74, 454/75, 71; 244/129.5; 224/118.5; 165/234, 165/235
See application file for complete search history.

(56) References Cited

U.S. PATENT DOCUMENTS

| 2,870,698 A | 1/1959 | Best |
| 2,905,071 A | 9/1959 | Krueger |
| 2,953,078 A * | 9/1960 | Best ................................ 454/71 |
| 2,991,706 A * | 7/1961 | Best ................................ 454/71 |

(Continued)

FOREIGN PATENT DOCUMENTS

CN 1396876 2/2003

(Continued)

OTHER PUBLICATIONS

Chinese Office Action for Appln. No. 2007800021059 dated Dec. 18, 2009.

(Continued)

Primary Examiner — Steven B McAllister
Assistant Examiner — Phillip E Decker
(74) Attorney, Agent, or Firm — Carter, DeLuca, Farrell & Schmidt LLP

(57) ABSTRACT

In a process and a system for controlling the pressure in an aircraft cabin the status of at least one aircraft door is detected by at least one detection device by transmitting a signal indicative of the status of the aircraft door to a unit for controlling an avionics ventilation system which is controlled in dependence upon the signal indicative of the status of the aircraft door in such a way that a build-up of pressure in the aircraft cabin is prevented when the signal indicative of the status of the aircraft door indicates that the aircraft door is not fully closed and secured.

12 Claims, 2 Drawing Sheets

U.S. PATENT DOCUMENTS

Figure 1:
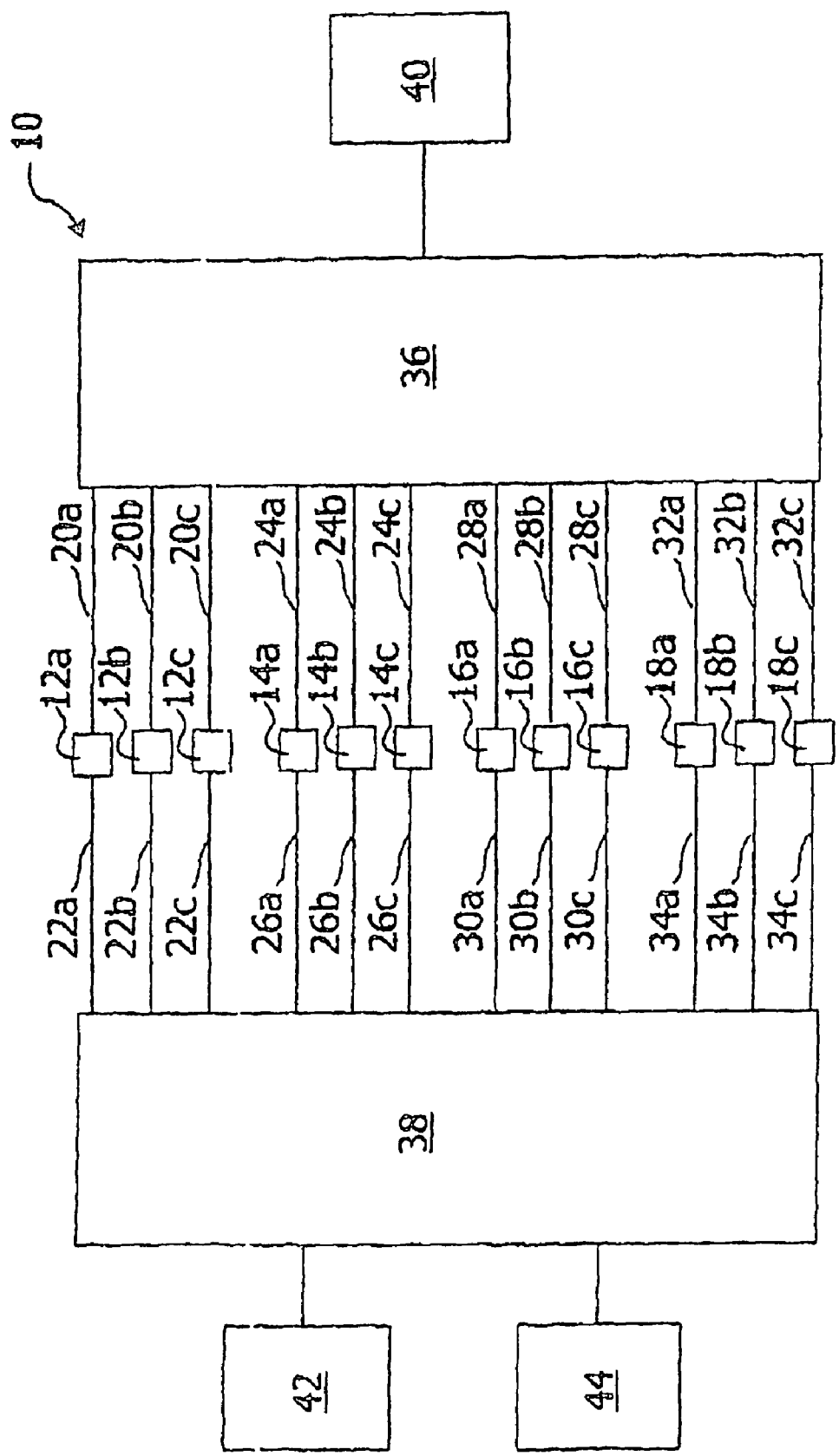

| | | | | |
|---|---|---|---|---|
| 4,262,495 A * | 4/1981 | Gupta et al. | | 62/402 |
| 4,967,565 A * | 11/1990 | Thomson et al. | | 62/57 |
| 5,253,484 A * | 10/1993 | Corman et al. | | 454/76 |
| 5,273,486 A * | 12/1993 | Emmons et al. | | 454/74 |
| 5,327,744 A * | 7/1994 | Frawley et al. | | 454/76 |
| 5,480,109 A | 1/1996 | Klein et al. | | |
| 5,701,755 A * | 12/1997 | Severson et al. | | 62/402 |
| 5,860,283 A * | 1/1999 | Coleman et al. | | 62/87 |
| 5,934,614 A * | 8/1999 | Mueller et al. | | 454/76 |
| 5,984,234 A * | 11/1999 | Brouwer et al. | | 244/129.5 |
| 6,402,812 B1 * | 6/2002 | Perrotta et al. | | 454/71 |
| 6,633,239 B2 * | 10/2003 | Plude et al. | | 244/129.5 |
| 6,676,504 B2 * | 1/2004 | Petri et al. | | 454/74 |
| 6,746,322 B2 * | 6/2004 | Scheerer et al. | | 454/74 |
| 6,796,527 B1 * | 9/2004 | Munoz et al. | | 454/76 |
| 7,462,098 B2 * | 12/2008 | Arthurs et al. | | 454/74 |
| 7,624,732 B2 * | 12/2009 | Mitchell et al. | | 454/76 |
| 7,740,201 B2 * | 6/2010 | Eichholz et al. | | 244/129.5 |
| 2003/0066929 A1 * | 4/2003 | Valencia et al. | | 244/118.5 |
| 2005/0218266 A1 * | 10/2005 | Bandy et al. | | 244/118.5 |
| 2007/0125908 A1 * | 6/2007 | Eichholz et al. | | 244/118.1 |
| 2009/0084896 A1 * | 4/2009 | Boucher et al. | | 454/76 |

FOREIGN PATENT DOCUMENTS

| | | |
|---|---|---|
| DE | 4309058 C1 | 12/1994 |
| EP | 0616941 A1 | 9/1994 |
| JP | 06321188 A * | 11/1994 |
| RU | 2 216 485 C2 | 11/2003 |
| SU | 828 606 A1 | 3/1984 |
| WO | WO 2009051875 A2 * | 4/2009 |

OTHER PUBLICATIONS

International Search Report, dated Jun. 22, 2007.
English translation of Decision to Grant for Appln. No. 2008126795/11(032781), Nov. 30, 2009.

* cited by examiner

PROCESS AND SYSTEM FOR CONTROLLING THE PRESSURE IN AN AIRCRAFT CABIN

The invention relates to a process and to a system for controlling the pressure in a part of an aircraft which during flight is usually kept at a pressure which is higher than the ambient pressure.

By reason of the ambient pressure being significantly lower at the cruising altitude of an aircraft than atmospheric pressure at sea level it is necessary to build up in an aircraft passenger cabin and possibly also in the aircraft cargo hold a pressure which is higher than the ambient pressure. Typically the cabin pressure in a passenger aircraft at a cruising altitude of 9000-12000 m is about 750 mbar, which corresponds to the ambient pressure at an altitude of about 2500 m above sea level. In order to pressurise the aircraft cabin air is usually supplied into the cabin from an air conditioning system, wherein pressure control is adopted by a cabin pressurisation system which includes at least one air outlet valve disposed e.g. on the underside of the aircraft fuselage.

During the pressure build-up phase taking place in a passenger aircraft typically during take-off or when climbing there is a potential risk that an aircraft door which has not been correctly closed and secured may be torn from its hinges owing to the pressure difference arising between the interior of the aircraft and the ambient atmosphere. This would cause damage to the aircraft structure which is classified as catastrophic in the regulations governing the authorisation of commercial aircraft. For this reason pressurisation of the aircraft passenger cabin or of the cargo hold when an aircraft door is not correctly closed and secured must usually be prevented with a level of reliability of $10^{-9}$.

From DE 43 09 058 C1 an arrangement is known in which an air conditioning system of a passenger aircraft is controlled in such a way that the air supply into the aircraft passenger cabin is prevented or interrupted when corresponding door-monitoring devices indicate that a cabin door is not correctly closed and secured. In this way a build-up of pressure in the aircraft passenger cabin is effectively prevented.

U.S. Pat. No. 4,262,495 describes an aircraft air-conditioning system which supplies a passenger cabin and an avionics bay of the aircraft with fresh air. When the aircraft is on the ground air is drawn from the passenger cabin into the avionics bay by means of a fan. Exhaust air from the avionics bay is released into the ambient atmosphere through an opened outlet valve. During flight, however, the fan is switched off and the outlet valve is closed. By reason of the pressure s difference existing between the cabin pressure and the pressure in the avionics bay air is passed uniformly from the passenger cabin into the avionics bay. The discharge of exhaust air from the avionics bay is effected through a venturi device and an exhaust air line.

In a passenger aircraft in which a build-up of pressure in the aircraft cabin usually takes place exclusively during take-off and when climbing and the cabin pressure is then kept substantially constant, the air-conditioning system can be used successfully to effect this so-called PoP (Prevention of Pressurisation) function in the event that an aircraft door is not correctly closed and secured. In some aircraft provided e.g. for military applications, however, there is a necessity to reduce the pressure—which has been increased above the ambient pressure e.g. during take-off or when climbing—in the cabin during flight in order to be able to open an aircraft door and e.g. eject goods or drop parachutists.

In particular at high altitudes the low air pressure prevailing in the cabin after depressurisation causes the problem to arise in these aircraft that fans used to cool the avionics system can no longer sufficiently provide cooling energy, i.e. are no longer able to function adequately. In order to ensure the cooling of the avionics system in all flight situations, i.e. even when the aircraft cabin is depressurised, it is necessary for the cooling function fulfilled by the cooling fans at higher cabin pressures to be taken over by the air-conditioning system thus of the aircraft at low cabin pressures. When the cabin is re-pressurised during flight, e.g. after the in-flight discharge of goods is finished, the air-conditioning system cannot be used to effect a PoP function if an aircraft door is not correctly closed and secured, since the prevention or interruption of the air supply into the cabin would lead to insufficient cooling and therefore to damage of the avionics systems.

The object of the invention is to provide a process and a system for controlling the pressure in an aircraft cabin which, with the required high level of reliability, prevent pressurisation of the cabin when an aircraft door is not correctly closed and secured even in aircraft in which, during flight, a reduction of the cabin pressure to the ambient pressure level and a subsequent renewed build-up of cabin pressure to a pressure level higher than the ambient pressure must be possible.

In order to achieve this object the present invention includes detecting the status of an aircraft door by means of at least one detection device. The term "aircraft door" is here intended to mean a door which, in the opened condition, produces a connection between a part of an aircraft which, during flight, is usually kept at a pressure higher than the ambient pressure, and the surroundings. The part of an aircraft which is usually kept at a pressure higher than the ambient pressure during flight is herein generally termed the "aircraft cabin" and can be e.g. an aircraft passenger cabin or an aircraft cargo hold or the like. Accordingly the aircraft door can be e.g. a cabin door, a loading ramp or a loading door. During detection of the status of the aircraft door a check is made as to whether the aircraft door is correctly closed and secured. If the aircraft has a number of aircraft doors the invention can make provision for the status of all the aircraft doors present to be detected.

After detection of the status of the aircraft door a transmission device is used in accordance with the invention to transmit a signal indicative of the status of the aircraft door to a unit for controlling an avionics ventilation system. The transmission device can be any signal-transmitting device. The avionics ventilation system can include e.g. a fan or a plurality of fans and at least one air outlet valve and serves to cool the avionics system during operational situations of the aircraft in which sufficiently high pressure prevails in the aircraft cabin, i.e. when the aircraft is on the ground or when, during flight, a cabin pressure higher than the ambient pressure is provided.

In accordance with the invention the avionics ventilation system is controlled by the control unit, which is designed e.g. as an electronic control unit, in dependence upon the signal indicative of the status of the aircraft door in such a way that a build-up of pressure in the aircraft cabin is prevented when the signal indicative of the status of the aircraft door indicates that the aircraft door is not fully closed and secured. By means of the present invention it is therefore possible to effect a PoP function in the case where an aircraft door is not correctly closed and secured even without bringing in the aircraft air conditioning system. The invention makes it thus possible to reliably prevent pressurisation of the cabin when an aircraft door is not correctly closed and secured in an aircraft in which even during flight a reduction of the cabin pressure to the ambient pressure level and a subsequent renewed build-up of cabin pressure to a pressure level higher than the ambient pressure must be possible. Furthermore, the present invention can naturally be used in a conventional passenger aircraft as an alternative to the system described in DE 43 09 058 C1.

The unit for controlling the avionics ventilation system preferably controls an air outlet valve of the avionics ventilation system in such a way that a build-up of pressure in the aircraft cabin is prevented when the signal indicative of the status of the aircraft door indicates that the aircraft door is not fully closed and secured. The air outlet valve controlled by the control unit can be e.g. a so-called overboard valve of the avionics ventilation system by means of which cooling exhaust air is discharged from the aircraft cabin during cooling operation of the avionics ventilation system. When the signal indicative of the status of the aircraft door indicates that the aircraft door is not fully closed and secured the control unit of the avionics ventilation system controls the flow cross-section of the air outlet valve and therefore the aircraft leakage produced thereby in such a way that a build-up of pressure in the aircraft cabin is reliably prevented. For example, the air outlet valve of the avionics ventilation system can be kept fully open in order to effect a PoP function when an aircraft door is not correctly closed and secured, so that, as a result of the pressure equalisation taking place through the flow cross-section of the air outlet valve, pressurisation of the aircraft cabin is rendered impossible.

In a preferred embodiment of the present invention the signal indicative of the status of the aircraft door is transmitted via a corresponding transmission device additionally to a unit for controlling a cabin pressurisation system. The transmission device can again be any signal transmission device. The cabin pressurisation system preferably includes two air outlet valves which can be e.g. disposed on the lower side of the aircraft fuselage. The control unit controls the cabin pressurisation system preferably in dependence upon the signal indicative of the status of the aircraft door in such a way that a build-up of pressure in the aircraft cabin is prevented when the signal indicative of the status of the aircraft door indicates that the aircraft door is not fully closed and secured. The cabin pressurisation system is controlled independently of the control of the avionics ventilation system so that two redundant systems are provided to effect a PoP function when an aircraft door is not correctly closed and secured. In this way it is ensured that pressurisation of the aircraft cabin when an aircraft door is not correctly closed and secured is prevented with the necessary level of reliability of $10^{-9}$.

The control unit preferably controls at least one air outlet valve of the cabin pressurisation system in such a way that a build-up of pressure in the aircraft cabin is prevented when the signal indicative of the status of the aircraft door indicates that the aircraft door is not fully closed and secured. The air outlet valve—controlled by the control unit—of the cabin pressurisation system, e.g. a so-called outflow valve, serves in normal operation of the cabin pressurisation system to control the cabin pressure, wherein by means of the setting of a corresponding flow cross-section of the air outlet valve air can be discharged from the cabin and therefore the cabin pressure can be reduced. When the signal indicative of the status of the aircraft door indicates that the aircraft door is not fully closed and secured the control unit of the cabin pressurisation system controls the flow cross-section of the air outlet valve and therefore the aircraft leakage produced thereby in such a way that a build-up of pressure in the aircraft cabin is reliably prevented. For example, the air outlet valve of the cabin pressurisation system can be kept fully open in order to effect a PoP function when an aircraft door is not correctly closed and secured, so that as a result of the pressure equalisation taking place through the flow cross-section of the air outlet valve pressurisation of the aircraft cabin becomes impossible.

When the cabin pressurisation system includes a plurality of air outlet valves all air outlet valves of the cabin pressurisation system are controlled by the control unit of the cabin pressurisation system in such a way that a PoP function is effected when an aircraft door is not correctly closed and secured.

In a preferred embodiment of the present invention the signal indicative of the status of the aircraft door is transmitted via dissimilar signal transmission devices to the unit for controlling the avionics ventilation system and to the unit for controlling the cabin pressurisation system. By providing dissimilar signal transmission devices an additional redundancy is created so that it can be ensured that a PoP function is effected with the necessary level of reliability when an aircraft door is not correctly closed and secured.

The status of the aircraft door is preferably detected by at least two mutually independent detection devices. For example, suitable sensors can be used as the detection devices. At least two, preferably three, sensors are then provided on the or each aircraft door and each provide redundant signals indicative of the status of the or each aircraft door for transmission to the control unit of the avionics ventilation system and the control unit of the cabin pressurisation system.

Figure 2:
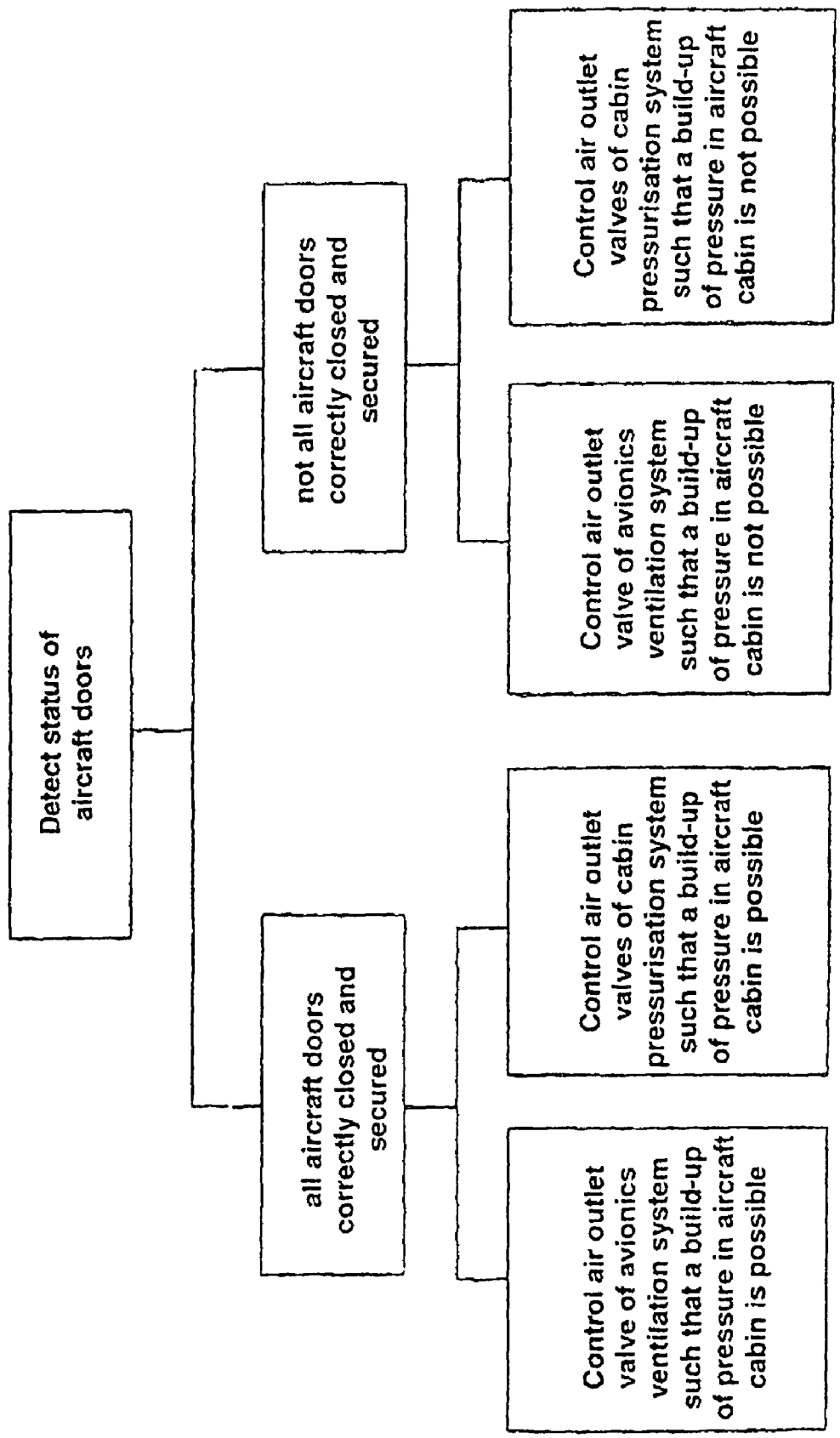

A preferred embodiment of a system in accordance with the invention and of a process in accordance with the invention for controlling the pressure in an aircraft cabin will now be explained in more detail with the aid of the attached schematic drawings in which FIG. 1 is a schematic illustration of a system for controlling the pressure in a part of an aircraft normally kept at a pressure higher than the ambient pressure during flight, and FIG. 2 is a flow diagram of a process for controlling the pressure in a part of an aircraft normally kept at a pressure higher than the ambient pressure during flight, i.e. an aircraft cabin.

FIG. 1 shows a schematic illustration of a system 10 for controlling the pressure in a part of an aircraft which is normally kept at a pressure higher than the ambient pressure during flight and which is hereinunder designated "aircraft cabin" and can be e.g. an aircraft passenger cabin, a cargo hold or the like. The system 10 includes a series of detection devices 12a-c, 14a-c, 16a-c, 18a-c, of which in each case three are allocated to a corresponding aircraft door connecting an interior space of the aircraft cabin to the external surroundings. The detection devices 12a-c, 14a-c, 16a-c, 18a-c designed e.g. as suitable sensors serve to detect the status of the respective aircraft door, i.e. to determine whether the aircraft door is open or correctly closed and secured. The three detection devices 12a-c, 14a-c, 16a-c, 18a-c allocated to each aircraft door are each formed independently of each other and therefore provide three mutually independent redundant signals indicative of the status of the aircraft door.

In order to transmit the signals detected by the detection devices 12a-c, 14a-c, 16a-c, 18a-c and indicating the status of the respective aircraft doors the system 10 includes a series of transmission devices 20a-c, 22a-c, 24a-c, 26-26c, 28a-c, 30a-c, 32a-c, 34a-c. The transmission devices 20a-c, 22a-c, 24a-c, 26-26a-c, 28a-c, 30a-c, 32a-c, 34a-c are in each case designed as mutually independent dissimilar signal transmission devices and serve to transmit the signals detected by the detection devices 12a-c, 14a-c, 16a-c, 18a-c and indicating the status of the respective aircraft doors to an electronic control unit 36 of an avionics ventilation system and an electronic control unit 38 of a cabin pressurisation system.

The electronic control unit 36 of the avionics ventilation system is adapted to control an air outlet valve 40—also designated as an overboard valve—of the avionics ventilation system in such a way that a build-up of pressure in the aircraft cabin is prevented when a signal indicative of the status of an aircraft door and detected by one or a plurality of the detection devices 12a-c, 14a-c, 16a-c, 18a-c indicates that an aircraft door is not fully closed and secured.

In a similar manner the electronic control unit 38 of the cabin pressurisation system is adapted to control two air outlet valves 42, 44—also designated as outflow valves—of the cabin pressurisation system in such a way that a build-up of pressure in the aircraft cabin is prevented when a signal indicative of the status of an aircraft door and detected by one or a plurality of the detection devices 12a-c, 14a-c, 16a-c, 18a-c indicates that an aircraft door is not fully closed and secured.

FIG. 2 shows the progress of the process effected by means of the system 10 for controlling the pressure in an aircraft cabin. In a first process step the status of all aircraft doors connecting the interior space of the aircraft cabin to the external surroundings is detected by the detection devices 12a-c, 14a-c, 16a-c, 18a-c. Within the framework of the status detection it is determined whether the aircraft doors are correctly closed and secured, wherein for each aircraft door three redundant signals indicative of the status of the respective aircraft door are provided by three mutually independent detection devices 12a-c, 14a-c, 16a-c, 18a-c.

When all signals provided by the detection devices 12a-c, 14a-c, 16a-c, 18a-c and indicating the status of the aircraft doors indicate that all aircraft doors are correctly closed and secured a build-up of pressure in the aircraft cabin is permitted in order to bring the aircraft cabin to a pressure which is higher than the low atmospheric pressure prevailing at the corresponding altitude of the aircraft. The build-up of pressure in the aircraft cabin can take place e.g. during take-off or when the aircraft is climbing. Furthermore, the build-up of pressure in the aircraft cabin can also take place during flight if the aircraft cabin has previously been depressurised in order to be able to open an aircraft door and e.g. to eject goods or to drop parachutists.

In order to build up the cabin pressure the control units 36, 38 of the avionics ventilation system and of the cabin pressurisation system, in response to the respective signals provided by the detection devices 12a-c, 14a-c, 16a-c, 18a-c, control the air outlet valve 40 of the avionics ventilation system and the air outlet valves 42, 44 of the cabin pressurisation system in such a way that a pressure higher than the ambient pressure can be built-up in the aircraft cabin. The air outlet valves 40, 42, 44 are fully closed in order to prevent a pressure equalisation between the aircraft cabin and the ambient atmosphere.

On the other hand if one of the signals provided by the detection devices 12a-c, 14a-c, 16a-c, 18a-c indicates that an aircraft door is not correctly closed and secured the air outlet valve 40 of the avionics ventilation system is controlled by the control unit 36 in such a way that the air outlet valve 40 is kept fully open. As a result of the pressure equalisation between the ambient atmosphere and the aircraft cabin taking place through the flow cross-section of the air outlet valve 40, pressurisation of the aircraft cabin is rendered impossible.

At the same time the control unit 38 of the cabin pressurisation system controls the air outlet valves 42, 44 of the cabin pressurisation system in such a way that these air outlet valves 42, 44 are also kept fully open. Pressure equalisation between the ambient atmosphere and the aircraft cabin therefore also takes place through the flow cross-section of the air outlet valves 42, 44 of the cabin pressurisation system and prevents a build-up of pressure in the aircraft cabin.

The electronic control unit 36 of the avionics ventilation system and the electronic control unit 38 of the cabin pressurisation system therefore ensure—independently of each other—that a PoP function is effected when an aircraft door is not correctly closed and secured, i.e. they prevent a build-up of pressure in the aircraft cabin when a signal provided by the detection devices 12a-c, 14a-c, 16a-c, 18a-c indicates that an aircraft door is not fully closed and secured. By means of this redundancy provided in the system 10 it is ensured that pressurisation of the aircraft cabin when an aircraft door is not correctly closed and secured is prevented with the required level of reliability of $10^{-9}$.

The invention claimed is:

1. A process for controlling the pressure in an aircraft cabin, comprising the steps of:
    detecting the status of an aircraft door,
    transmitting a signal indicative of the status of the aircraft door to a unit for controlling an avionics ventilation system and an air conditioning system, the avionics ventilation system cooling an avionics system of the aircraft during operational situations in which sufficiently high pressure prevails in the aircraft cabin and discharging cooling exhaust air from the aircraft cabin, the air conditioning system being adapted to cool the avionics system of the aircraft when less than sufficiently high pressure prevails in the air craft cabin, and
    controlling the avionics ventilation system in dependence upon the signal indicative of the status of the aircraft door wherein a build-up of pressure in the aircraft cabin is prevented when the signal indicative of the status of the aircraft door indicates that the aircraft door is not fully closed and secured.

2. The process according to claim 1, wherein the unit for controlling the avionics ventilation system controls an air outlet valve of the avionics ventilation system and a build-up of pressure in the aircraft cabin is prevented when the signal indicative of the status of the aircraft door indicates that the aircraft door is not fully closed and secured.

3. The process according to claim 1, further comprising the steps of:
    transmitting the signal indicative of the status of the aircraft door to a unit for controlling a cabin pressurization system, and
    controlling the cabin pressurization system in dependence upon the signal indicative of the status of the aircraft door wherein a build-up of pressure in the aircraft cabin is prevented when the signal indicative of the status of the aircraft door indicates that the aircraft door is not fully closed and secured.

4. The process according to claim 3, wherein the unit for controlling the cabin pressurization system controls at least one air outlet valve of the cabin pressurization system and a build-up of pressure in the aircraft cabin is prevented when the signal indicative of the status of the aircraft door indicates that the aircraft door is not fully closed and secured.

5. The process according to claim 3, wherein the signal indicative of the status of the aircraft door is transmitted via dissimilar signal transmission devices to the unit for controlling the avionics ventilation system and to the unit for controlling the cabin pressurization system.

6. The process according to claim 1, wherein the status of the aircraft door is detected by at least two mutually independent detection devices.

7. A system for controlling the pressure in an aircraft cabin, comprising:
    at least one detection device for detecting the status of an aircraft door;
    an avionics ventilation system cooling an avionics system of the aircraft during operational situations in which sufficiently high pressure prevails in the aircraft cabin discharging cooling exhaust air from the aircraft cabin, an air conditioning system cooling the avionics system of the aircraft when less than sufficiently high pressure prevails in the air craft cabin; and a transmission device for transmitting a signal indicative of the status of the aircraft door to a unit for controlling the avionics ventilation system, wherein the unit for controlling the avionics ventilation system controls the avionics ventilation system in dependence upon the signal indicative of the status of the aircraft door such that a build-up of pressure in the aircraft cabin is prevented when the signal indicative of the status of the aircraft door indicates that the aircraft door is not fully closed and secured.

8. The system according to claim 7, wherein the unit for controlling the avionics ventilation system controls an air outlet valve of the avionics ventilation system and a build-up of pressure in the aircraft cabin is prevented when the signal indicative of the status of the aircraft door indicates that the aircraft door is not fully closed and secured.

9. The system according to claim 7, further comprising:
a transmission device for transmitting the signal indicative of the status of the aircraft door to a unit for controlling a cabin pressurization system, wherein the unit for controlling the cabin pressurization system controls the cabin pressurization system in dependence upon the signal indicative of the status of the aircraft door and a build-up of pressure in the aircraft cabin is prevented when the signal indicative of the status of the aircraft door indicates that the aircraft door is not fully closed and secured.

10. The system according to claim 9, wherein the unit for controlling the cabin pressurization system controls at least one air outlet valve of the cabin pressurization system and a build-up of pressure in the aircraft cabin is prevented when the signal indicative of the status of the aircraft door indicates that the aircraft door is not fully closed and secured.

11. The system according to claim 9, wherein the transmission device for transmitting the signal indicative of the status of the aircraft door to a unit for controlling an avionics ventilation system and the transmission device for transmitting the signal indicative of the status of the aircraft door to the unit for controlling a cabin pressurization system are dissimilar signal transmission devices.

12. The system according claim 7, further comprising at least two mutually independent detection devices for detecting the status of the aircraft door.

* * * * *